March 8, 1966     A. SPAAK ETAL     3,239,001
COOLING APPARATUS
Filed July 23, 1963     2 Sheets-Sheet 1
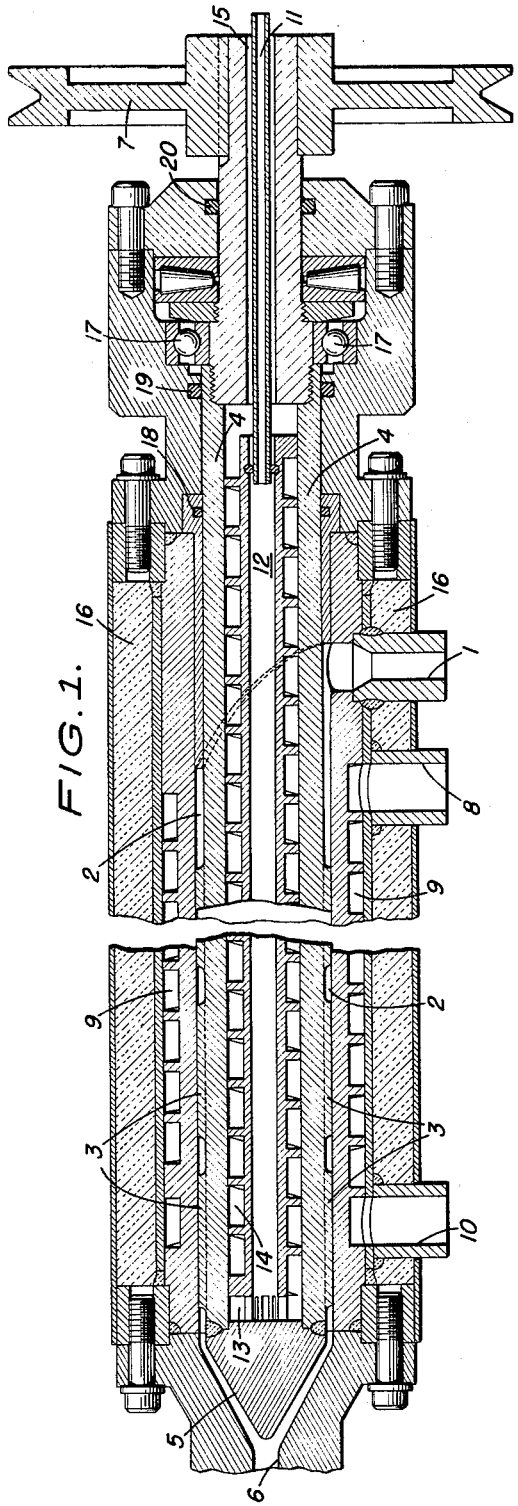
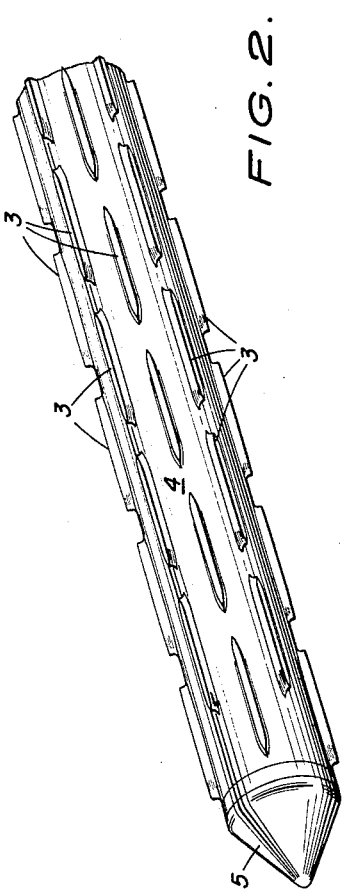
ALBERT SPAAK
HAROLD G. TINGER
INVENTORS
BY *Francis H. Dey*
ATTORNEY

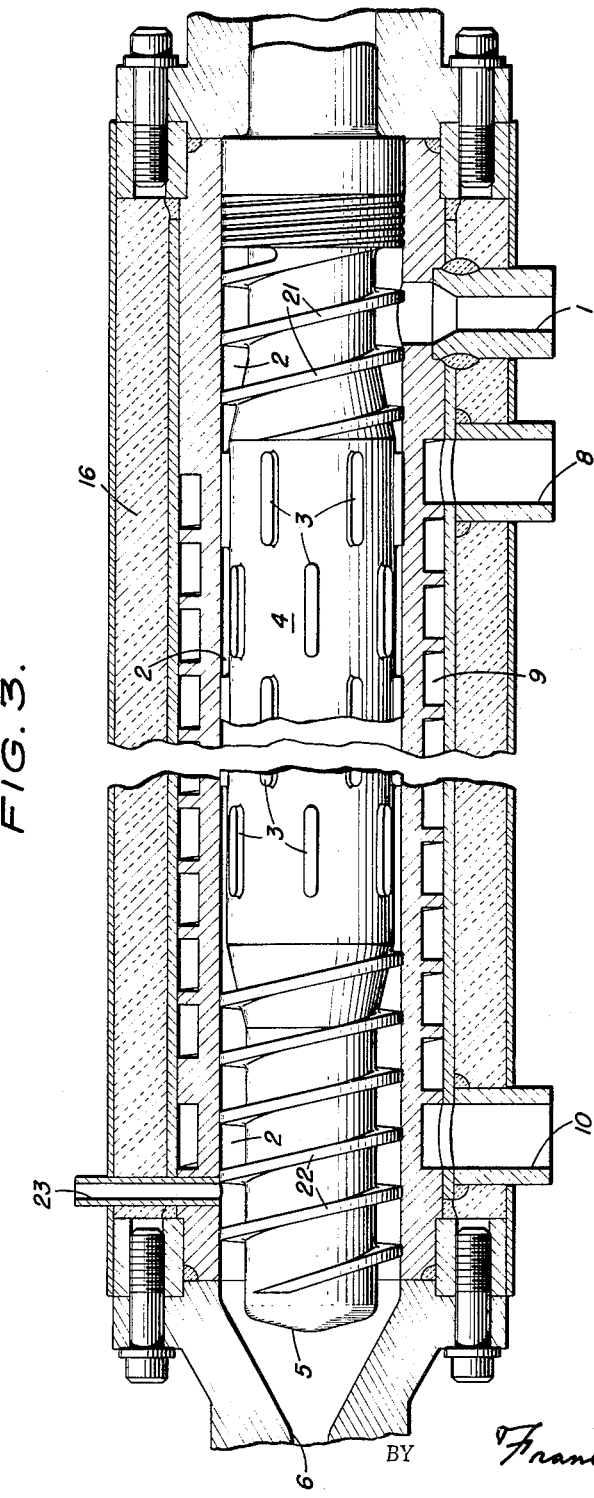

3,239,001
COOLING APPARATUS
Albert Spaak, Little Falls, and Harold G. Tinger, Wayne, N.J., assignors to W. R. Grace & Co., New York, N.Y., a corporation of Connecticut
Filed July 23, 1963, Ser. No. 297,133
2 Claims. (Cl. 165—87)

The present invention relates to a novel and useful apparatus. More particularly, it relates to a cooling apparatus which is particularly adapted for uniformly reducing the temperature of polymers which have been subjected to a heat treatment.

It is known in the art that the properties of polymers may be altered by subjecting the polymer to a heating process. For example, it is known that the molecular weight distribution of polyethylene will be effected by heating the polymer substantially above its melting point. Such thermal degradation affects polymer properties such as the melt index and is desirable in many instances. In thermally degrading such polymers, it is essential that the polymer be both uniformly heated and cooled so that colored impurities will not be formed in the process. Uniform heating and cooling is also essential to give reproducible results and close quality control. Many extruders and similar machines are currently on the market which will produce a uniform and constant heating cycle. However, very few machines, if any, are available which will give the required uniform cooling cycle necessary for reproducible results and quality control. Obviously, if a suitable cooling apparatus were developed which fulfilled all the necessary requirements, it would be readily accepted in the art.

It is an object of the present invention to provide a cooling apparatus useful for cooling hot viscous liquids. A further object is to provide a simple and relatively inexpensive cooling apparatus which is particularly adapted for cooling thermally degraded polymers. A still further object is to provide a cooling apparatus for reducing the temperature of thermally degraded polyethylene. Other objects will become apparent as the description of the invention proceeds.

These objects are accomplished by the present invention which provides a cooling apparatus comprising an elongated cylindrical wall forming a cooling chamber with an inlet and outlet port at generally opposite ends of the chamber, a means for cooling the inside surface of said chamber, a rotatable shaft co-axially located within and spaced from the walls of said chamber and terminating in a taper at said inlet port, said shaft containing a plurality of protrusions which have tapered forward and rearward ends and extend axially from the shaft and terminate immediately adjacent the inside surface of said chamber and a means for cooling the surface of said shaft.

In a preferred embodiment of the present invention, the cooling chamber is substantially cylindrical and the means for cooling the inside surface of the chamber is a spiral cooling jacket. In the preferred embodiment, the center of the rotatable shaft is hollow and the hollow portion is flowably connected to a spiral cooling jacket located between the hollow portion of the shaft and the outside of the shaft. It is also preferred that a screw advancing means in the form of a helix be provided on the shaft in the area adjacent the polymer inlet and/or outlet ports to prevent undue pressures from building up in such areas. In a still more preferred embodiment, a supplemental inlet port is provided to the cooling chamber so that pigments, plasticizing agents, flame retardant materials, stabilizers and the like may be added and thoroughly mixed while the polymer is being cooled.

The expression tapered forward and rearward ends is used to signify that the protrusions are longitudinally streamlined or curved or pointed towards the lengthwise or flow direction so that there will be no holdup of polymer which would cause the formation of colored impurities in the final product.

The invention is hereinafter more fully described by reference to the drawings.

In the accompanying drawings which illustrate preferred embodiments of the present invention:

FIGURE 1 is a cross-sectional view of the cooling apparatus taken along its longitudinal axis;

FIGURE 2 is a perspective sketch of the shaft shown in cross section in FIGURE 1; and FIGURE 3 shows a preferred embodiment of the present invention in which the outer portion of the apparatus is shown in cross section.

In FIGURE 1, the hot polymer is supplied to the cooling apparatus through the polymer inlet port 6. The polymer then proceeds around the streamlined end 5 of the rotating shaft 4 to the cooling chamber 2. In the cooling chamber 2, the polymer is constantly agitated by the longitudinally streamlined protrusions 3 which extend from the rotating shaft 4 to the cooling chamber wall and constantly scrape the wall clean of polymer. The end of the rotating shaft 5 at the inlet port 6 and the longitudinal edges of the protrusions 3 are streamlined to prevent polymer buildup which would cause degradation and discoloration in the final product. From the cooling chamber 2, the polymer proceeds to the outlet port 1 which can be connected to a conventional apparatus for the formation of pellets or flake.

A pulley arrangement 7 or other means is employed to impart motion to the rotating shaft 4. In order to cool the polymer, a cooling fluid is supplied to inlet 8 where it proceeds in a helical fashion in the spiral cooling jacket 9 to cooling fluid outlet 10. By the use of such an arrangement, a substantially constant temperature may be maintained along the inner wall of cooling chamber 2. To aid in the cooling process, the rotating shaft 4 is also cooled. To accomplish this result, a cooling fluid is sent through inlet 11 of the rotating shaft 4 to the hollow center 12 of the shaft. The cooling fluid then proceeds to the far end 13 of the hollow center where the direction of the flow is reversed through the spiral cooling jacket 14 of the shaft. The cooling fluid then exits through outlet 15 of the hollow shaft. The direction of flow of both cooling fluids can be reversed if desired.

In order to maintain a constant temperature gradient across the various heat exchanging surfaces, the apparatus is provided with an optional insulated jacket 16 which completely encloses the apparatus. For easy rotation of the shaft within the cooling chamber, the apparatus is provided with an optional roller bearing assembly 17 and sealing elements 18, 19 and 20 which are used to prevent the polymer from backing up into the assembly.

In FIGURE 2, the hollow shaft 4 of FIGURE 1 is shown in perspective to illustrate the streamlining of the longitudinal protrusions 3 and the tapered end 5 of the rotating shaft 4.

In FIGURE 3, an optional feature of the invention is provided on the rotating shaft 4 to prevent undue pressure buildup in the cooling chamber 2. The optional feature is a screw advancing means 22 located immediately adjacent the polymer inlet port 6 to provide uniform pressure and flow in this area. After the polymer is uniformly cooled in the cooling chamber 2 by the use of the streamlined longitudinal protrusions 3, a second screw advancing means 21 is utilized to avoid excessive pressures near the polymer outlet port 1. As an optional feature, the cooling chamber 2 may be provided with a supplemental inlet port 23 so that pigments, plasticizing agents and like materials may be added and thoroughly mixed when desired. In other respects of construction, the apparatus of FIGURE 3 is substantially the same as that shown in FIGURE 1.

EXAMPLE

A cooling apparatus is constructed as shown in FIGURES 1 and 2. It has a length of 4 feet and an outside diameter of 9 inches including a thickness of 1½ inches of insulation completely enclosing the apparatus. The inside diameter of the cooling chamber is 4 inches and it has an overall length of 3½ feet. The protrusions on the shaft are ¼ inch high, 4 inches long and have the configuration shown in the figures. The remaining dimensions are shown substantially drawn to scale in FIGURES 1 and 2. The polymer outlet port is directly connected to a conventional pelletizer.

A polyethylene homopolymer which has been subjected to a thermal degradation is fed into the inlet port of the apparatus at a temperature of 70° F. A high boiling cooling fluid ("Ucon" 50-HB-180X) at 330° F. is circulated through the hollow center of the shaft and it returns through the spiral cooling jacket of the shaft at a temperature of 348° F. The same cooling fluid is circulated in the spiral cooling jacket for the cooling chamber at the same inlet and outlet temperatures. The shaft is rotated at a speed of 20 r.p.m. The polyethylene emerges from the outlet at a temperature of 360° F. from which it is fed to a conventional pelletizer to be formed into pellets. After two hours of continual operation, no discoloration is noted in any of the product showing that substantially no colored impurities are formed in the chamber. Also, there is substantially no change in the temperature of the polymer in the outlet showing a high degree of uniformity in cooling.

Many equivalent modifications will be apparent to those skilled in the art from a reading of the foregoing without a departure from the inventive concept.

What is claimed is:

1. A cooling apparatus comprising an elongated cylindrical wall forming a cooling chamber having an inlet and outlet port at generally opposite ends of the chamber, a spiral cooling jacket surrounding said cooling chamber for cooling the inside surface of said chamber, a hollow rotatable shaft coaxially located within and spaced from the walls of said chamber and terminating in a taper at the inlet port, said shaft containing (1) a plurality of elongated protrusions which have tapered forward and rearward ends and extend axially from the shaft and terminate immediately adjacent the inside surface of said chamber; (2) a screw advancing means in the form of a helix in the areas adjacent the polymer inlet and outlet port; and (3) a means for cooling the surface of said shaft comprising a spiral cooling coil located within the shaft and flowably connected to the hollow interior of the shaft.

2. The cooling apparatus of claim 1 wherein the cooling chamber contains a supplemental inlet port for the addition of additives.

References Cited by the Examiner

UNITED STATES PATENTS

| 462,696 | 11/1891 | Garretson et al. | 165—91 |
| 1,813,142 | 7/1931 | Boudin | 165—89 |
| 1,949,374 | 2/1934 | Johnson | 165—87 X |
| 2,713,474 | 7/1955 | Read | 165—94 X |
| 2,761,658 | 9/1956 | Magnusson | 165—90 X |
| 2,946,572 | 7/1960 | Annis | 165—120 X |

JAMES W. WESTHAVER, *Primary Examiner.*

FREDERICK L. MATTESON, JR., *Examiner.*